US 6,639,542 B2

(12) United States Patent
Autio et al.

(10) Patent No.: US 6,639,542 B2
(45) Date of Patent: Oct. 28, 2003

(54) DETECTOR WITH PIVOTAL DISPLAY

(75) Inventors: Craig R. Autio, Orange, MA (US); Michael Batten, Westminster, MA (US)

(73) Assignee: The Whistler Group, Chelmsford, MA (US)

(*) Notice: Subject to any disclaimer, the term of this patent is extended or adjusted under 35 U.S.C. 154(b) by 0 days.

(21) Appl. No.: 10/033,751

(22) Filed: Dec. 19, 2001

(65) Prior Publication Data

US 2002/0196175 A1 Dec. 26, 2002

Related U.S. Application Data

(60) Provisional application No. 60/300,687, filed on Jun. 25, 2001.

(51) Int. Cl.[7] ............................. G01S 7/04; G01S 7/40
(52) U.S. Cl. ........................ 342/20; 342/104; 340/936
(58) Field of Search .................. 342/20, 104; 340/936, 340/942, 555

(56) References Cited

U.S. PATENT DOCUMENTS

| 4,818,997 A | | 4/1989 | Holmes |
| 5,146,227 A | | 9/1992 | Papadopoulos |
| 5,239,296 A | * | 8/1993 | Jenkins ...................... 340/555 |
| 5,243,549 A | | 9/1993 | Oshiba |
| 5,666,120 A | | 9/1997 | Kline et al. |
| 5,668,554 A | | 9/1997 | Orr et al. |
| 5,847,676 A | * | 12/1998 | Cole .......................... 342/104 |
| 5,972,915 A | | 10/1999 | Hofmeister et al. |
| 5,979,764 A | | 11/1999 | Swyst et al. |
| 5,990,821 A | | 11/1999 | Sakar |
| 2002/0003571 A1 | * | 1/2002 | Schofield et al. ........... 348/148 |

* cited by examiner

*Primary Examiner*—Ian J. Lobo
(74) *Attorney, Agent, or Firm*—David W. Carstens; Carstens Yee & Cahoon LLP

(57) ABSTRACT

A detector device for detecting the presence of a speed detection system which includes a displaying means which pivots in relation to the device's housing thereby allowing a user to selectively adjust the orientation of the display to maximize the display's visual output without detracting from the alignment/orientation of the device's detection means.

14 Claims, 5 Drawing Sheets

DETECTOR WITH PIVOTAL DISPLAY

RELATED APPLICATIONS

The present invention is based on Provisional Ser. No. 60/300,687 filed on Jun. 25, 2001. The content of this application is incorporated herein by reference.

BACKGROUND OF THE INVENTION

1. Technical Field

The present invention relates to a detector device, and more particularly, to a display for a detector device which pivots in relation to the device's housing thereby allowing a user to selectively adjust the orientation of the display to maximize the display's visual output without detracting from the alignment/orientation of the device's detection means.

2. Description of the Related Art

As is generally known in the art, speed detection systems may be used to determine the speed of moving objects, such as automobiles and other motorized vehicles. Speed detection systems currently known in the art typically utilize either radar or laser devices in their operation. A speed detection system which utilizes radar may generally be referred to as a so-called radar gun. Radar guns typically include a microwave signal source which emits a signal having a frequency in the radio-frequency electromagnetic spectrum. The radio-frequency spectrum utilized in speed-detection radar devices is divided into a series of bands, with each band covering a range of frequencies within the radio-frequency spectrum. The frequencies of interest range from about 10.525 to 35.200 GHz., although all the frequencies within this range are not allocated for speed-detection radar devices. The bands which are allocated for this purpose include: the X-band, which ranges from 10.500–10.550 GHz.; the K-band, which ranges from 24.050–24.250 GHz.; and the Ka band, which presently ranges from 34.200–35.200 GHz. Furthermore, radar guns may emit signals in either a continuous or a pulsed mode A laser speed detection system or so-called laser gun, on the other hand, includes a laser which is a device that converts input power into a very narrow, intense beam of coherent energy at a single optical frequency, generally, but not necessarily, within the visible to infrared frequency region of the electromagnetic spectrum. Like radar guns, laser guns may also operate either continuously or in a pulsed mode. However, laser guns generally operate in a pulsed mode due to input power requirements, cooling problems, and other considerations of the laser.

Operators of moving vehicles oftentimes find it useful know when the speed of their vehicle is being monitored. For example, it may be desirable for an operator of a moving automobile to know when the speed of the automobile is being detected by a speed detection system. Thus, electronic assemblies for detecting the presence of speed detection systems have been developed and are now in common use. Typically, such assemblies include a detection means, a processing means and a displaying means.

For example, an electronic assembly capable of detecting the presence of speed detection systems utilizing radar device is generally known and will be referred to as a radar detector. A radar detector typically includes an antenna which receives radiated radio-frequency electromagnetic waves and converts them into electrical signals. A horn antenna 120, such as shown in FIG. 6 of U.S. Pat. No. 5,146,227, is typical of conventional radar detectors. The horn antenna derives its name from the characteristic flared appearance. The flared portion can be square, rectangular, or conical. The maximum response of such an antenna corresponds with the axis of the horn.

An electronic assembly capable of detecting the presence of speed detection systems utilizing a laser device is generally known and will be referred to as a laser detector. A laser detector typically utilizes one or more photo-detectors and a laser detection circuit which provides logic signals to a microprocessor upon detection of a signal in the appropriate infrared band.

Combination radar/laser detection devices have quickly gained in popularity with the general public. A combination laser/radar detector 10 described in U.S. Pat. No. 5,990,821 is typical of conventional combination detection devices, the disclosure of which is expressly incorporated herein by reference. As shown therein, in FIG. 1 and FIG. 1A, a combination laser/radar detector 10 includes a laser detector circuit 12 and a radar detector circuit 14. Laser detector 12 and radar detector 14 are each coupled to a microcontroller 16 or 16'. Microcontroller 16 or 16' receives signals fed thereto from each of the laser and radar detectors 12, 14 and in response thereto microcontroller 16 or 16' provides control signals to the laser and radar detectors and to a display 18. The choice between using a single microcontroller or a pair of microcontrollers may be made according to a variety of factors including but not limited to the cost of manufacturing the detector system 10 having one microcontroller compared with the cost of manufacturing the detector system 10 having a plurality of separate microcontrollers A more detailed description of the construction and operation of electronic assemblies for detecting the presence of speed detection systems is not deemed necessary herein. Furthermore, the description of devices capable of detecting laser and/or radar speed detection systems is merely illustrative and should not be construed as a limitation. It is foreseeable that other technologies may exist which are capable of adaptation to speed detection systems, and conversely means may be constructed for detecting the use of such technologies. However, in general, all detector devices adapted for use in moving vehicles will include a detection means, a processing means and a displaying means.

Detector devices commonly known in the art typically include a housing self-containing the detection, processing and displaying means. The housing is typically comprised of a generally rectangular box with the detection means protruding out one end, the displaying means fixed on the other end, and the processing means disposed there between. The housing may also include an internal power source or a port for external power supply. The housing of such prior art detector devices is typically mounted on the dashboard of a motor vehicle or clipped to an overhead visor. When properly mounted, the longitudinal axis of the detector device is typically oriented parallel with the longitudinal orientation of the motor vehicle. The detection means of the device is typically oriented with the front and/or, in some instances, the rear of the vehicle.

Displaying means may include, for example, a display screen comprised of light emitting diodes (LEDs). Alternatively or in addition thereto, displaying means may include a liquid crystal display (LCD) a vacuum fluorescent (VF) display or an LED segment display and the corresponding driver circuits. Those of ordinary skill in the art will recognize, of course, that other types of displays may also be used. As noted previously, the displaying means is typically fixed to one end of the detector device's housing and when properly positioned faces the passenger compartment of the motor vehicle.

A problem arises when a glare of light reflects off the display screen of the displaying means detracting from the display screen's visual output to the user. While the initial problem may be remedied by simply adjusting the angular orientation of the detector device to the user so that the light will not reflect off the display screen, in so doing another problem is created. Because the detection, processing and displaying means are typically fixed in the housing of most current detector devices, by adjusting the angular position/orientation of a detector device so as to better view the display screen correspondingly changes the angular position/orientation of the detection means. Due to cost and size constraints, the detection means of current detector devices are typically focused in a particular orientation to maximize the responsiveness of a particular detection means. The axis of maximum responsiveness of any detection means may be termed the focal axis. For example, the longitudinal axis of a detector device's housing is typically oriented with the axis of the horn antenna because focal axis of such an antenna corresponds with the axis of the horn.

Similarly, photodiodes used to detect laser signals utilize lenses to focus the reception of such signals. In general, signals appearing along the central axis of the lens are magnified to a greater extent than signals appearing around the periphery of the lens. Typically, when only one lens is utilized, its central or focal axis is aligned with longitudinal axis of a detector device's housing which, when properly mounted, corresponds in parallel with the motor vehicle's longitudinal axis. While multiple lenses may be configured so as to expand the field of view of a particular photodiode, as noted in U.S. Pat. No. 5,990,821, blind spots may exist in regions between the lenses. Thus, because detector means are typically fixed in the housing of detector devices, critical attention is given to the placing of various detection means within the detector device so as to maximize their effectiveness.

In general, the detection means of current detector devices are designed so that when the detector device is properly mounted in a motor vehicle, the focal axis of the various detection means are aligned parallel with the longitudinal axis of the motor vehicle. Thus, when the angular orientation of a detector device is adjusted to remedy the problem of glare on the display screen, the device's focal axis is correspondingly changed from its designed parameters so that the sensitivity of its detection means is necessarily degraded to some extent.

One prior proposal to remedy this problem involves constructing the display at a fixed-tilt angle from the longitudinal axis of the device. For example, the display of such a device may be tilted towards the user/driver of a motor vehicle so as to improve the line of sight between the user and the display. However, because the display is still fixed, it is still possible for light glare to reflect off of the display. Moreover, the fixed-tilt angle requires a detector device to be constructed in two separate models depending upon whether the driver is positioned on the left or right side of the passenger compartment. Finally, motor vehicles come in all different sizes. While a fixed-tilt angle might be appropriate for one model of motor vehicle, it may entirely inappropriate for another model of motor vehicle.

Another prior proposal to remedy this problem is U.S. Pat. No. 4,818,997, to Holmes, wherein a displaying means is remotely located from the detection and processing means. While the Holmes device allows the alignment of the displaying means to be adjusted without adversely affecting the focal axis of the detection means, the Holmes device does not allow for constant adjustment of the displaying means and does not allow the detection, processing, and displaying means to be arranged in a convenient self-contained housing.

Thus, a need exists for an improved, detector device which allows a user to selectively adjust the orientation of the display to maximize the display's visual output without detracting from the alignment/orientation of the device's detection means.

SUMMARY OF THE INVENTION

The present invention overcomes many of the disadvantages of prior art devices for detecting speed detection systems, by allowing the display of the device to pivot in relation to the housing of the device. Thus, the designed focal axis of the detection means is always maintained in its proper orientation to maximize the effectiveness of the detection means.

The improved detector device includes a housing containing a detection means, a processing means, and a displaying means wherein the displaying means is allowed to pivot in relation to said housing. The displaying means may be designed to pivot either left or right of center. The detector device may also include an internal power source and/or a port to an external power source.

The improved detector device may further include a gimbal assembly allowing the display to pivot around more than one axis. Additionally, selective detents may be provided so as to create a plurality of fixed positions wherein the display may be adjusted to without detracting from the effectiveness of the device's detection means.

Thus, in accordance with one feature of the present invention, a user may adjust the display of the detector device without detracting from the effectiveness of the device's detection means.

BRIEF DESCRIPTION OF THE DRAWINGS

A more complete understanding of the method and apparatus of the present invention may be had by reference to the following detailed description when taken in conjunction with the accompanying drawings, wherein.

Where used in the various figures of the drawing, the same numerals designate the same or similar parts. Furthermore, when the terms "top," "bottom," "first,"

Figure 1A:
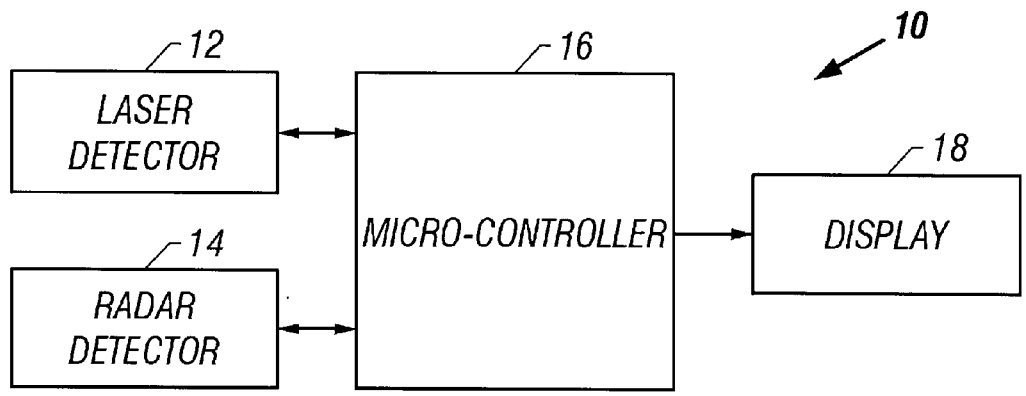
FIG. 1a is a block diagram of a combination radar/laser detector device.

"second," "upper," "lower," "height," "width," "length," "end," "side," "horizontal," "vertical," and similar terms are used herein, it should be understood that these terms have reference only to the structure shown in the drawing and are utilized only to facilitate describing the invention.

DETAILED DESCRIPTION OF THE INVENTION

Figure 1B:
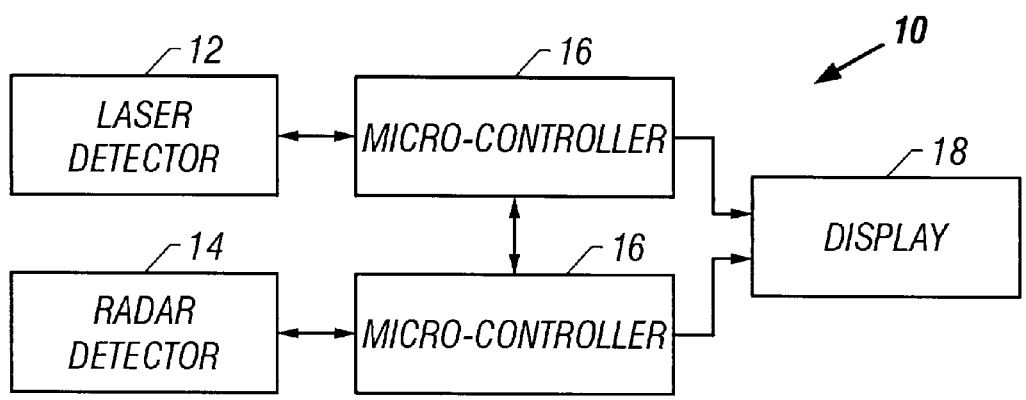
FIG. 1b is a block diagram of a combination radar/laser detector device including a pair of microprocessors.
Figure 2A:
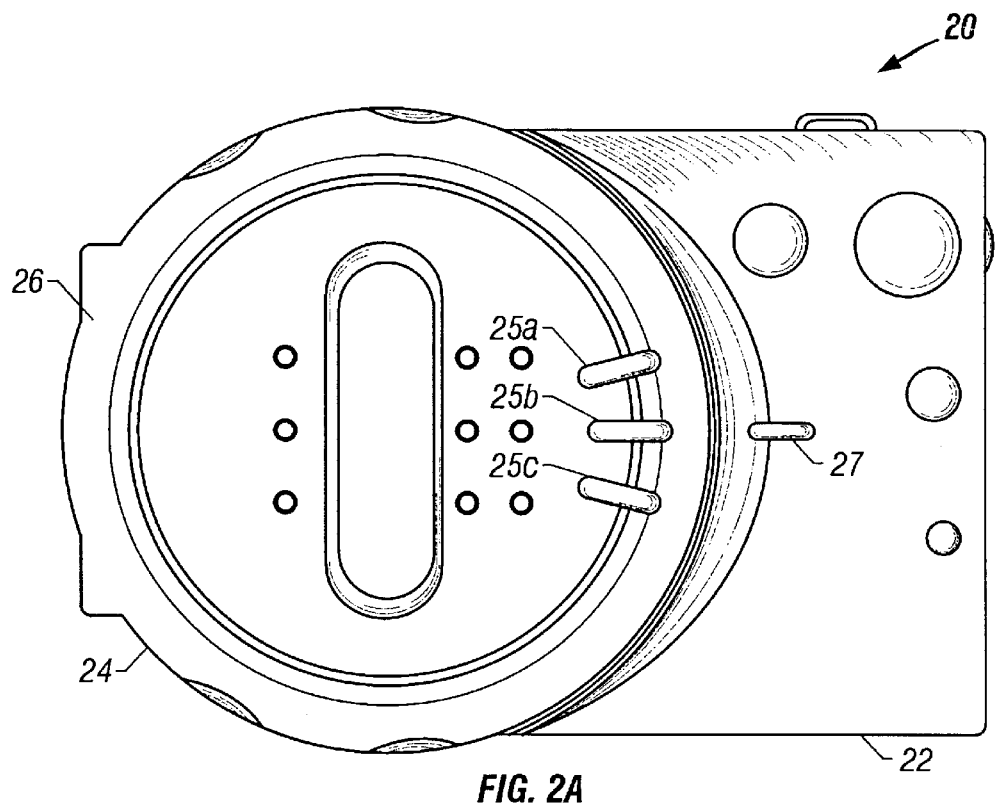
FIG. 2a is an overhead view of a first embodiment of a detector device with pivotal display.
Figure 2B:
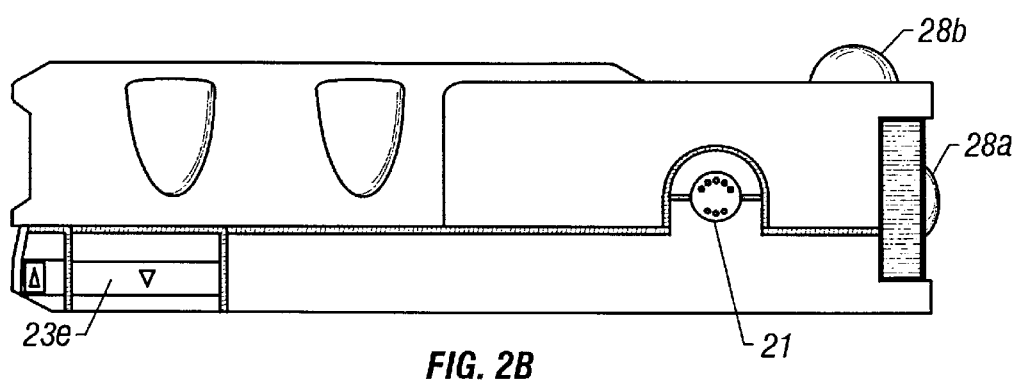
FIG. 2b is side view of a first embodiment of a detector device with pivotal display.
Figure 2C:
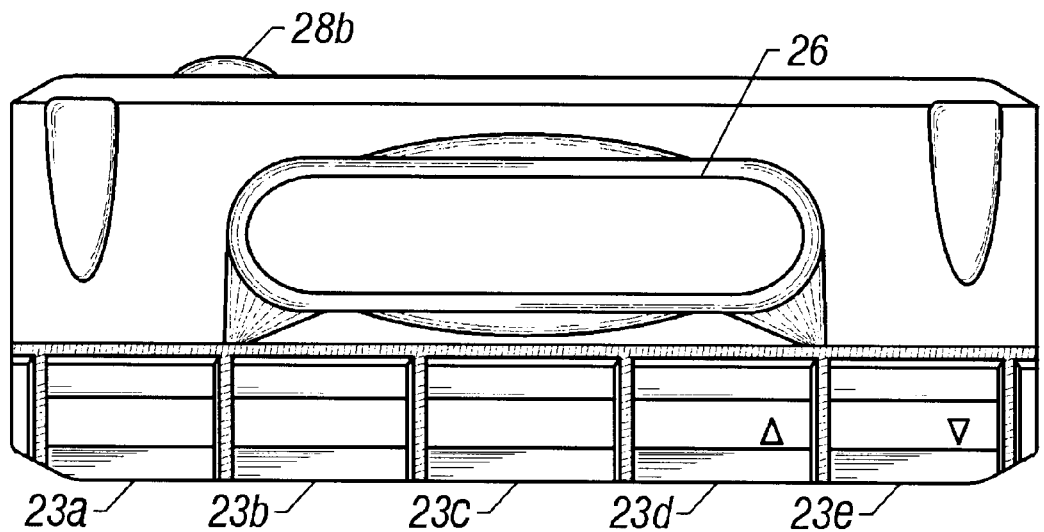
FIG. 2c is a frontal view of a first embodiment of a detector device with pivotal display.
Figure 2D:
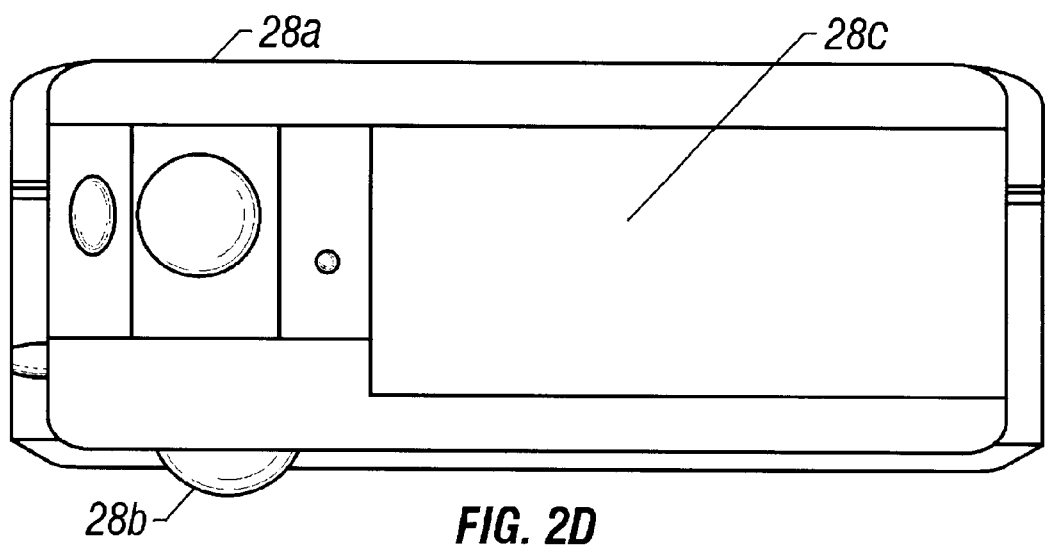
FIG. 2d is rear view of a first embodiment of a detector device with pivotal display.

A block diagram of the electronic assembly of the preferred detector device is presented in FIGS. 1a and 1b. While there are many known electronic assemblies that would be adequate for this application, a device as described in U.S. Pat. No 5,990,821, the disclosure of which is expressly incorporated herein by reference, will suffice. The detector device is a combination laser/radar detector 10 comprising a laser detector circuit 12 and a radar detector circuit 14. Laser detector 12 and radar detector 14 are each coupled to a microcontroller 16. Microcontroller 16 receives signals fed thereto from each of the laser and radar detectors 12, 14 and in response thereto microcontroller 16 provides control signals to the laser and radar detectors and to a display 18.

Displaying means may include, for example, a display screen comprised of light emitting diodes (LEDs). Alternatively or in addition thereto, displaying means may include a liquid crystal display (LCD) a vacuum fluorescent (VF) display or an LED segment display and the corresponding driver circuits. Those of ordinary skill in the art will recognize, of course, that other types of displays may also be used.

It should be noted that microcontroller 16 is here shown as a single microcontroller coupled to both the laser and radar detectors 12, 14. As shown in FIG. 1b, however, in an alternate embodiment of detector system 10 a pair of microcontrollers 16, 16' may be provided with a first one of the pair being coupled to a first one of the laser and radar detectors 12, 14 and a second one of the pair of microcontrollers being connected to a second one of the laser and radar detectors 12, 14. The choice between using a single microcontroller or a pair of microcontrollers may be made according to a variety of factors including but not limited to the cost of manufacturing the detector system 10 having one microcontroller compared with the cost of manufacturing the detector system 10 having a plurality of separate microcontrollers.

FIGS. 2a–2d show a first embodiment of a detector device having a pivotal display constructed in accordance with the present invention. The detector 20 is comprised of a main housing 22 containing a detecting means and processing means and a pivotally attached secondary housing 24 containing a displaying means 26. The main housing 22 may also contain an internal power source (e.g., a battery or the like) and/or an electrical power port 22 whereby power may be supplied by an external source (not shown). The main housing includes a series of apertures 28a–28c whereby the various detection means may detect incoming signals. One or more multi-function buttons 23a–23e are conveniently located on the detector device to provide the user with selectable features such as power, city, quiet, volume up, volume down, etc. The pivotally attached secondary housing 24 includes a plurality of detent markers 25a–25c delineating various position whereby the secondary housing 24 may be rotated in relation to the center stop marker 27 located on the main housing 22.

Figure 3A:
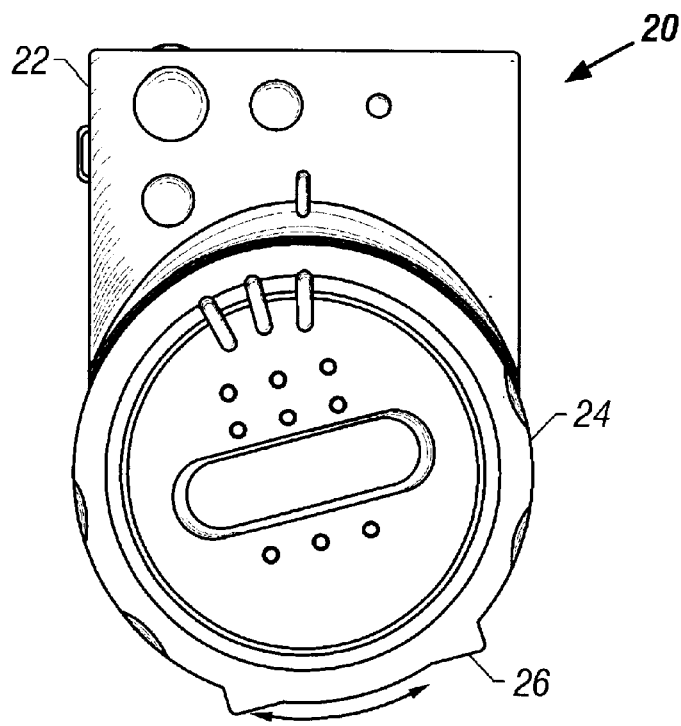
FIGS. 3a and 3b are overhead views of a first embodiment of a detector device with pivotal display showing the display in two detent positions.
Figure 3B:
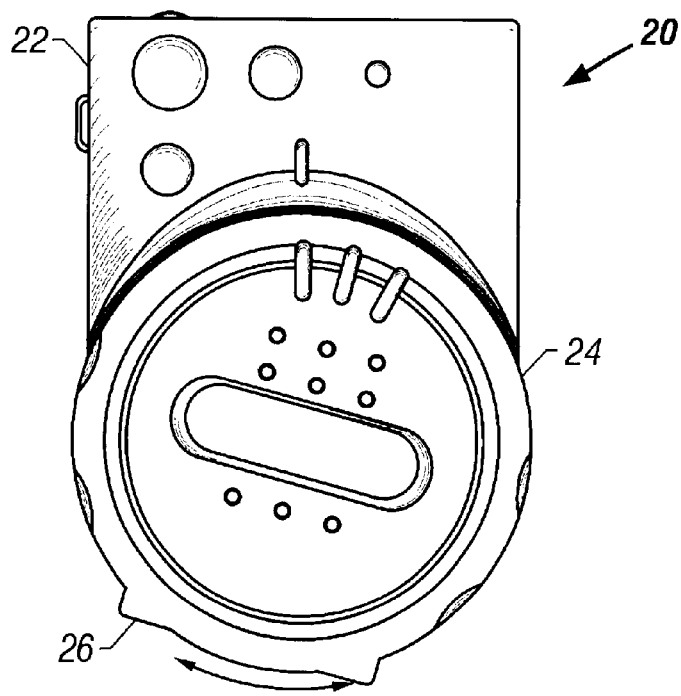

Referring now to FIGS. 3a and 3b, the operation the first embodiment of a detector device having a pivotal display constructed in accordance with the present invention is illustrated. In accordance with commonly known practices, the main housing 22 of the detector 20 is fixably attached to the dashboard or other suitable surface of a motor vehicle (not shown) so as to align the designed focal axis of the detector to maximize the effectiveness of the detection means. Once attached in accordance with the preceding practice, a user may freely adjust the display 26 of the detector 20 to maximize its visual output without detracting from the alignment/orientation of the detector's 20 various detection means. For example, the user may rotate the pivotally attached secondary housing 24 counter-clockwise as shown in FIG. 3a or clockwise, as shown in FIG. 3b. The ability to adjust the display 26 of detector 20 in such a manner is significant in a global based economy wherein vehicles may be operated from a left or right seat. The ability to adjust a display 26 in two opposite directions allows the same detector to be sold worldwide with no modification. Thus, such a detector is equally adaptable to drivers whether they are in the United States or in the United Kingdom.

Figure 4A:
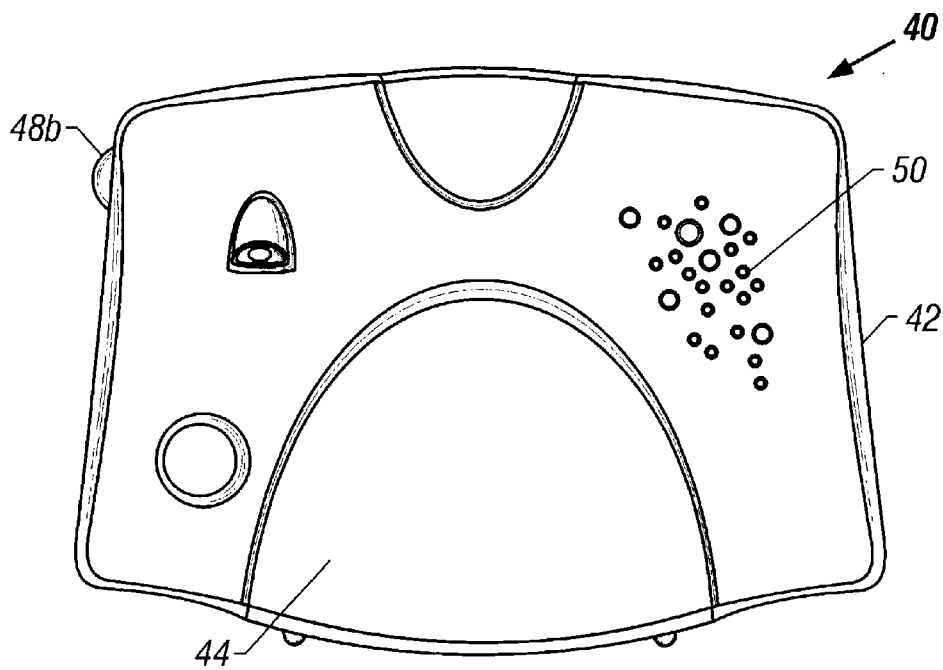
FIG. 4a is an overhead view of a second embodiment of a detector device with pivotal display.
Figure 4B:
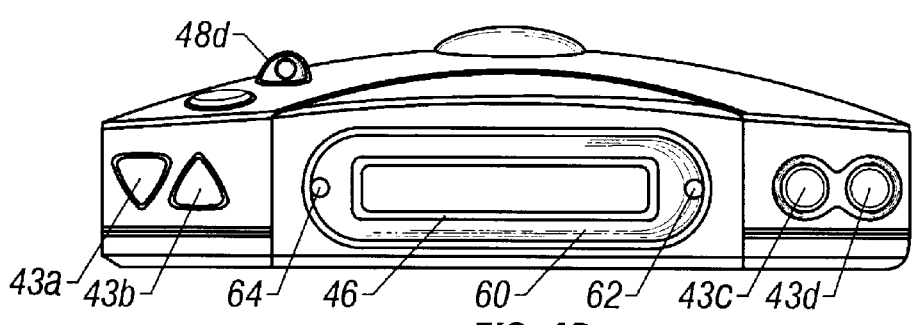
FIG. 4b is a rear view of a second embodiment of a detector device with pivotal display.
Figure 4C:
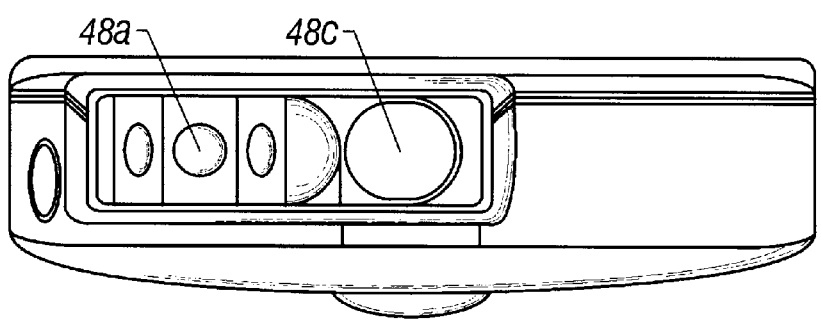
FIG. 4c is a frontal view of a second embodiment of a detector device with pivotal display.

FIGS. 4a–4c show a second embodiment of a detector device having a pivotal display constructed in accordance with the present invention. The detector 40 is comprised of a main housing 42 containing a detecting means and processing means and an attached secondary housing 44 containing a pivotally attached insert 60 that includes a displaying means 46. As in the first embodiment, the main housing 42 of the second embodiment may also contain an internal power source (e.g., a battery or the like) and/or an electrical power port (not shown) whereby power may be supplied by an external source (not shown). The main housing includes a series of apertures 48a–48d whereby the various detection means may detect incoming signals. One or more multi-function buttons 43a–43d are conveniently located on the detector device to provide the user with selectable features such as volume up, volume down, quiet, city, etc. The pivotally attached insert 60 has two protrusions or bumps 62, 64 which a user may depress causing the insert 60, and a display means 46 contained therein, to rotate within the secondary housing 44.

When the main housing 43 is fixably attached to a dashboard or other suitable surface of a motor vehicle in accordance with commonly known practices detailed previously, a user may freely adjust the insert 60, and a display means 46 contained therein, to maximize its visual output without detracting from the alignment/orientation of the detector's 40 various detection means.

It will now be evident to those skilled in the art that there has been described herein an improved display for a detector device which by allowing the display to pivot in relation to the device's housing allows a user to selectively adjust the orientation of the display to maximize the display's visual output without detracting from the alignment/orientation of the device's detection means.

Although the invention hereof has been described by way of a preferred embodiment, it will be evident that other adaptations and modifications can be employed without departing from the spirit and scope thereof. For example, while the pivotally attached displays and inserts shown allow movement about a single axis, practitioners will quickly recognize that a gimbal assembly may be utilized to allow a display to pivot in multiple axes. The terms and expressions employed herein have been used as terms of description and not of limitation; and thus, there is no intent of excluding equivalents, but on the contrary it is intended to cover any and all equivalents that may be employed without departing from the spirit and scope of the invention.

What is claimed is:

1. A detector device for detecting the presence of a speed detection system comprising:
   a housing containing;
   (i) means for detecting a first signal, wherein said first signal is generated by the speed detection system;
   (ii) means for processing said first signal into a second signal; and
   (iii) means for displaying said second signal,
   wherein said means for displaying is pivotally attached within said housing.

2. The device of claim 1 wherein said means for detecting includes means for detecting a microwave signal.

3. The device of claim 1 wherein said means for detecting includes means for detecting an infrared signal.

4. The device of claim 1 wherein said pivotally attached means for displaying may pivot about more than one axis.

5. The device of claim 1 wherein said second signal comprises a strength and a type indication of the first signal.

6. A detector device for detecting the presence of a speed detection system comprising in interlocking combination:
   (a) a main housing containing;
   (i) means for detecting a first signal, wherein said first signal is generated by the speed detection system;
   (ii) means for processing said first signal into a second signal; and
   (b) a second housing containing;
   (i) means for displaying said second signal,
   wherein said second housing is pivotally attached within said main housing.

7. The device of claim 6 wherein said means for detecting includes means for detecting an infrared signal.

8. The device of claim 6 wherein said means for detecting includes means for detecting a microwave signal.

9. The device of claim 6 wherein said pivotally attached means for displaying may pivot about more than one axis.

10. The device of claim 6 wherein said second signal comprises a strength and a type indication of the first signal.

11. A detector device for detecting the presence of a speed detection system comprising in interlocking combination:
    (a) a main housing containing;
    (i) means for detecting a first signal, wherein said first signal is generated by the speed detection system;
    (ii) means for processing said first signal into a second signal, wherein said second signal comprises a strength and a type indication of the first signal; and
    (b) a second housing contained within the main housing, and comprising,
    (i) a pivotally attached insert which includes a means for displaying said second signal.

12. The device of claim 11 wherein said means for detecting includes means for detecting a microwave signal.

13. The device of claim 11 wherein said means for detecting includes means for detecting an infrared signal.

14. The device of claim 11 wherein said pivotally attached means for displaying may pivot about more than one axis.

* * * * *